United States Patent [19]
Pricer

[11] 3,739,356
[45] June 12, 1973

[54] HETEROJUNCTION INFORMATION STORAGE UNIT

[75] Inventor: Wilber David Pricer, Burlington, Vt.
[73] Assignee: International Business Machines Corporation, Armonk, N.Y.

[22] Filed: June 21, 1971
[21] Appl. No.: 155,031

[52] U.S. Cl. .............................. 340/173 R, 307/238
[51] Int. Cl. .......................... G11c 11/36, G11c 5/02
[58] Field of Search ................ 340/173 R; 307/238; 317/235, 42 AC, 10 V, 48.4

[56] References Cited
UNITED STATES PATENTS
3,480,843 11/1969 Richardson ..................... 340/173 R
OTHER PUBLICATIONS
IEEE Digest, Semiconductor Memory Technology, "Bipolar Memories" by Barber, 3/22/71, p. 30–31.
Electronics, Electronics Review, "Toward MOS Memories," Vol. 41, No. 22, 10/68, p. 49–50.

*Primary Examiner*—Stanley M. Urynowicz, Jr.
*Attorney*—Wolmar J. Stoffel

[57] ABSTRACT

A bistable information storage unit which has a semiconductor device having two P–N heterojunctions arranged in opposing series relation. The heterojunctions each exhibit stable high and low impedance states due to a high density of material imperfections, including deep energy traps. In normal operation, the order of the impedance states of the heterojunctions of the device can be sensed and changed. The state or order of the junctions can be used to designate binary information.

13 Claims, 9 Drawing Figures

Patented June 12, 1973 3,739,356

2 Sheets-Sheet 1

INVENTOR
W. DAVID PRICER

BY Wolmar J. Stoffel
ATTORNEY

HETEROJUNCTION INFORMATION STORAGE UNIT

BACKGROUND OF THE INVENTION

The present invention relates to heterojunction devices, and more particularly to bistable switching and memory heterojunction devices and information storage units employing such devices.

New advances in information storage technology have resulted in innovations which increase dependability, reduce size and cost. The desirability of obtaining small, fast, and relatively inexpensive memory and switching units has lead to an interest in studying various bistable electrical effects in a variety of single crystal polycrystalline and amorphous materials. Such devices have taken the form of bulk and homojunction arrangements. However, various problems of speed and cost, reliability and fabrication have attended much of their development. The known devices when used as a memory have exhibited various disadvantages, one of which is that the devices exhibit a loss of memory upon a loss of bias on the devices. Such a loss of bias could occur in the event of a power failure which could result in a very serious disruption of the computer function associated with such memory devices.

SUMMARY OF THE INVENTION

It is an object of the present invention to provide a new information storage unit for storing binary information which utilizes a bistable semiconductor heterojunction device.

It is another object of this invention to provide an information storage unit for storing binary information that does not exhibit a loss of memory upon the loss of bias on the device.

Still another object of this invention is to provide a new information storage unit utilizing a heterojunction device that will occupy a relatively small space in a memory matrix.

Yet another object of this invention is to provide an information storage unit having a simple inexpensive structure.

Another object of the invention is to provide an information storage unit having bistable semiconductor elements that do not require a standby power source normally required for refreshing the information condition.

Still another object of the invention is to provide an information storage unit utilizing a heterojunction semiconductor device that can be interrograted either destructively or non-destructively and used either in a matrix, which is operated either in 2 1/2 D or 2 D mode.

The information storage unit is non-volatile and has a bistable device having first, second and third regions of semiconductor material separated by two heterojunctions. The first and third regions are of a first type material and the second regions are of a second type semiconductor material. Terminal means are provided on the first and third regions. The first type material contains a high density of material inperfections constituting deep energy traps which exist at densities at approximately equal to or greater than the density of the doping of the first type material. Each of the junctions are capable of exhibiting either a high impedance state or a low impedance state. A means is provided to sense the relative order of the impedance states of the junctions which condition can be used to store information.

BRIEF DESCRIPTIONS OF THE DRAWINGS

The foregoing and other objects, features, and advantages of the invention will be apparent from the following more particular description of preferred embodiments of the invention, as illustrated in the accompanying drawings.

IN THE DRAWINGS

DESCRIPTIONS OF PREFERRED EMBODIMENTS

Figure 1:
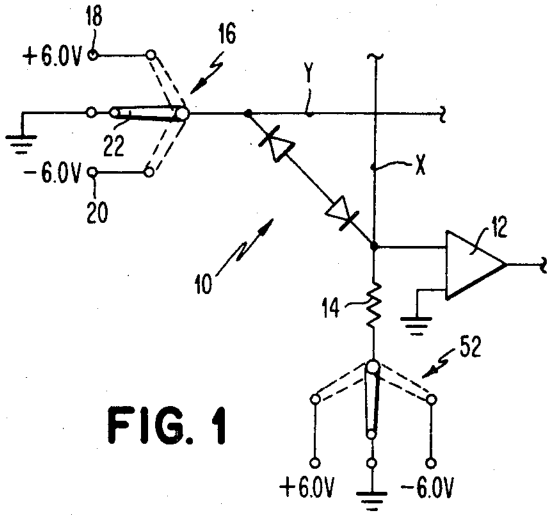
FIG. 1 illustrates a preferred specific embodiment of the non-volatile information storage unit of the invention in a matrix.

Referring now to the drawings, more particularly to FIG. 1, there is shown a first embodiment of the information storage unit of the invention embodied in a typical memory matrix. A memory matrix typically consists of a plurality of X lines combined with a plurality of transverse y lines. At each cross-point of the X and Y lines there is connected a heterojunction semiconductor device 10 which has a pair of semiconductor herterojunctions in opposed series relation. Each of the heterojunctions in device 10 is formed by the interface between a first doped semiconductor material and a second doped semiconductor material. One of the semiconductor materials has a high density of imperfections which include deep energy traps which exists at densities equal to or greater than the density of the doping impurity. The junctions are each capable of alternately exhibiting a stable high impedance state or a stable low impedance state. The storage unit also includes an operational amplifier 12 adapted to measure the voltage drop across resistor 14 and voltage source switch 52 in the X line. A Y driver circuit 16, shown schematically, includes a positive and negative energy source 18 and 20 in combination with a switch 22.

Device 10, which is the heart of the subject information storage unit has two heterojunctions arranged in opposing series relations. The heterojunction structure and operating characteristics are described in detail in co-pending commonly assigned application Ser. No. 46,943, Inventor, Harold J. Hovel, filed 6/17/70 now abandoned. The subject matter of this application is incorporated by reference into the specification of this application.

A heterojunction diode by reason of a high density of crystalline imperfections including energy traps in one of the semiconductor materials gives it the capability of assuming either of two states, i.e., a high impedance state, or a low impedance state. Further, the diode is capable of retaining either of the high or low impedance states for relatively long periods of time under zero bias.

Figure 2:
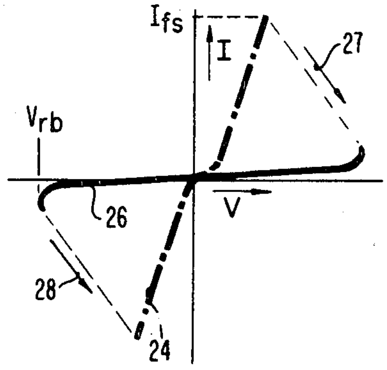
FIG. 2 shows V-I impedance characteristic for a form of a heterojunction diode.

Still further, the impedance state of the herterojunction can be shifted to the other state by applying a voltage bias across the junction or current of sufficient magnitude through the junction. A bias voltage in one direction will shift the impedance state in one direction while a bias of the opposite voltage will shift it from the opposite impedance, FIG. 2 illustrates the general operation of a heterojunction semiconductor diode which constitutes one-half of device 10. Line 24 in FIG. 2 illustrates the operation of a heterojunction in the low impedance state under both forward and reverse biases. Line 26 illustrates the operation of the heterojunction in the high impedance state. The heterojunction diode when operating in the low impedance state as indicated by line 24, can be changed to the high impedance state by applying a positive voltage sufficient to produce a current $I_{fs}$ which causes it to change to the high impedance state as indicated by arrow 27. The heterojunction when in the high impedance state can be changed to the low impedance state by imposing a negative threshold voltage $V_{rb}$ which causes it to change to the low impedance state as indicated by arrow 28. It should be noted that by reverse bias it is meant that a negative potential is applied to a P type doped region of the device and a positive potential is applied to the N type doped region of the device. However, heterojunction diodes have the feature that rectifying behaviour can be obtained even if both materials are of the same conductivity type. Therefore, the characteristics illustrated in the curve on FIG. 2 can be implemented using materials having the same conductivity types on both sides of the interface or junction as long as the other necessary conditions, such as the relationship of doping density of crystalline imperfection density in the grown layer are maintained. Accordingly, in accordance with the more general dininition for purposes of including the latter possiblity, reverse bias may be defined as a polarity of an applied voltage which causes the device to be switched from high impedance to low impedance state.

Figure 5:
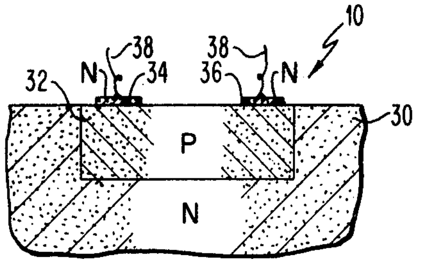
FIG. 5 is an elevational view in broken cross section of a preferred specific embodiment of the heterojunction semiconductor device used in the information storage unit of the invention.

In the fabrication of device 10 two heterojunctions exhibiting the aforediscussed characteristics can be connected in opposing series relation. Alternately, the device 10 can be fabricated as shown in FIG. 5 in a semiconductor body 30 of N type semiconductor material having a P type diffused region 32 formed therein. N type semiconductor regions 34 and 36 can be grown on the surface of a region 32 by suitable techniques which semidoncutor material has embodied therein a high density of material imperfections. The interface between regions 34 and 36 and 32 form heterojunctions in opposing series relation. Suitable ohmic contacts provide connection between regions 34 and 36 to terminals 38. The device structure 10 shown in FIg. 5 can be severed to form discrete devices and incorporate it into a matrix having conductive X and Y lines or alternatively the X and Y lines can be fabricated along with the devices on a single semiconductor element forming a memory matrix. If desired, associated driving and sensing circuits can be fabricated on the same element.

Device 10 when used in the storage unit illustrated in FIG. 1 will have one heterojunction operating in the low impedance state and the other heterojunction operating in the high impedance state. The relative order of the impedance can be changed as will be explained forming the basis for storing information.

An importnat aspect of the switching characteristic of a heterojunction device which constitutes one-half of device 10 of the present invention lies in the fact that the device junction remembers or retains its impedance state when all sources of potential are removed. Thus, when the diode in the low impedance state, as depicted by 24 in FIG. 2, it operates along line 24 in both the forward and reverse bias. As FIG. 2 indicates, the junction cannot be changed from its low impedance state to its high impedance state by the application of a reverse bias. However, a forwrd bias sufficient to increase the current to forward switching current level $I_{fs}$ will switch the diode to the high impedance state as indicated by arrow 27. Operation of the heterojunction will then be defined by a line 26. The heretrojunction, when in its high impedance state, can be converted to the low impedance state by application of a threshold reverse biasing voltage $V_{rb}$ as indicated in FIG. 2, whereupon an impedance change is effected as indicated by arrow 28. The heterojunction will retain either of the two impedance states in the absence of a bias. The retention or persistence of the impedance state with 0 or near 0 bias has been observed to exist for many days at room temperature.

Device 10 consists of two in series oppositely baised heterojunctions. Storage of information by device 10 is related to the respective impedance states of the two junctions which can be changed and sensed by suitable circuit arrangements. In operation, one heterojunction will be in the high impedance state while the other is in the low impedance state. The device 10, initially before being put into operation, may have both junctions in the low impedance state. This condition might also occur if the device is allowed to stand over prolonged periods of time. Device 10 can be initialized into opposite impedance states by applying a voltage pulse sufficient to cause the current threshold to be exceeded in the forward biased heterojunction. The impedance state in the forward biaseed junction will then be changed from low to high. No change in the impedance state will be effected in the reverse biased junction.

Figure 3:
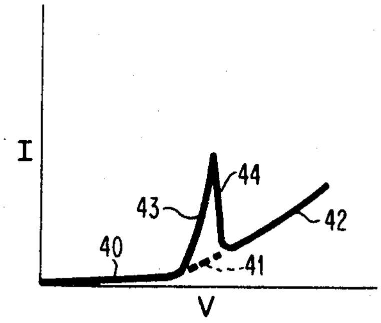
FIG. 3 shows a plot of amperage response vs. voltage for a voltage ramp excitation which illustrates alternate modes of operation of the heterojunction semiconductor device utilized in the information storage unit of the invention.

FIG. 3 illustrates the voltage ramp operation of the device 10 which permits detection of the relative impedance states of the junctions within the device. In operation, the current flowing through the junctions of the device is the same since they are connected in series. The voltage drop across each of the junctions is then determined by the product of the impedance or resistance, and the current. For the sake of explanation, assume first that the reverse biased heterojunction is in the low impedance state and the forward biased heterojunction is in the high impecance state. Application of a voltage pulse or ramp thus produces a relatively high voltage drop acorss the forward biased junction which is ineffective to change the impedance state as indicated by FIG. 2, Likewise, the current drawn through the reverse biased low impedance device is in a direction which will not cause switching since no amount of current can switch it in this direction. Thus, the high impedance state is maintained. Thus, the application of a pulse which produces the aforementioend condition is inoperative to change the relative order of the impedance states of the heterojunctions in device 10. A ramp voltage, as discussed, produces only an increase in current as indicated by the lines 40, 41, and 42 in FIG. 3.

Now considering the impedance states in the opposite condition where the reverse biased heterojunction is in the high impedance state and the forward biased heterojunction is in the low impedance state. Application of a voltage pulse of this nature effects a relatively high voltage drop acorss the reverse biased junction since the impedance is high. When the threshold voltage $V_{rb}$ is reached, the impedance state in the reverse biased junction will be changed to a low impedance state as indicated by arrow 28 in FIG. 2. Thus, the current in reponse to a ramp voltage wil follow line 40 until the change of impedance states is effected whereupon it will follow line 43. Since both junctions are in the low impedance state, the current in the forward biased junction rapidly increases until it reaches the forward switching current level $I_{fs}$ whereupon the impedance state in the forward biased junction will be changed to a high impedance state as indicated by arrow 27 in FIG. 2. The increased impedance sill rapidly decrease the current as shown by line 44 in FIG. 3. The device now has one heterojunction in the low impedance state and the second in the high impedance state as originally, but in a different order. Further application of the ramp voltage causes the device to follow line 42 as shown in FIG. 3. The short current pulse as indicated by lines 43 and 44 in FIG. 3 can be detected and used to determine the relative order of the impedance states in device 10.

Since the detection of the impedance state of device 10 has changed the order, it is desirable that the original condition be resotred. This can be accomplished by the application of a voltage pulse across device 10 of the opposite polarity. In the recent discussion, the original state in device 10 was the reverse biased heterojunction in the high impedance state, and the forward biased heterojunction in the low impedance state. The order of the impedances were thus reversed in the detection technique. In order to restore the original condition, a voltage pulse of the opposite polarity is applied whereupon the junction in the low impedance state is forward biased and the junction in the high impedance state is reverse biased. The order of the impedances would thus be reversed for hte reasons discussed previously.

Figure 4A:
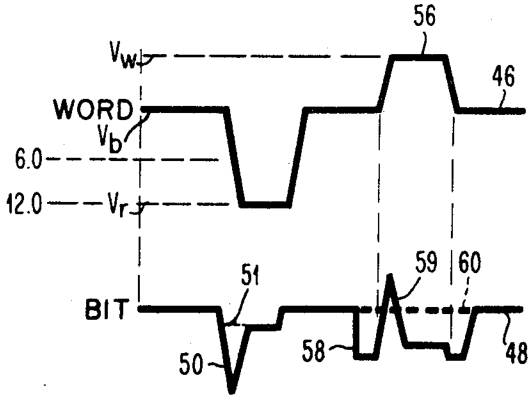
FIG. 4A illustrates input and output way-forms useful in explaining the operation of the unit shown in FIG. 1, used 2-dimensional operation.

Operation of the storage unit illustrated in FIG. 1 can be explained with reference to FIG. 4A which illustrates 2 D operation. Input waveforms are indicated in Curve 46 applied by driver circuit 22 shown in FIG. 1. A pulse of magnitude Vr is applied to the X line which in turn is applied to the entire row of device 10. A device in one order of impedance state will exhibit a response shown in Bit line 48 depicted by pulse 50, which includes a current blop. If the order of the heterojunction impedances are such that no change takes place, the current response on the X line as detected by operational amplifier 12 takes the form without blip 50 as indicated by a dotted line 51. In this form of operation, the X line is connected to ground as shown in the center position of switch 52. When interrogation of the devices produces a change of the order of impedances, the original condition of each device must be restored. This is done by imposing a second opposite pulse 56, as indicated on waveform 46, while simultaneously imposing a pulse to the X line of the opposite polarity by siwtch 52. This is shown as pulse 58 on waveform 48 in FIg. 4A. Blip 59 indicates that the order of the heterojunction impedances has been restored. This pulse to the X line is applied only to devices 10 in which an inpedance change has occured. This can be detected and controlled by appropriate circuitry not shown. Pulse 56, applied to the X line, is insufficient to effect an impedance order change in the device without a corresponding opposite pulse on the X line. The dotted line 60 shown in waveform 48 indicates operation where no change has been detected in device 10.

Figure 4B:
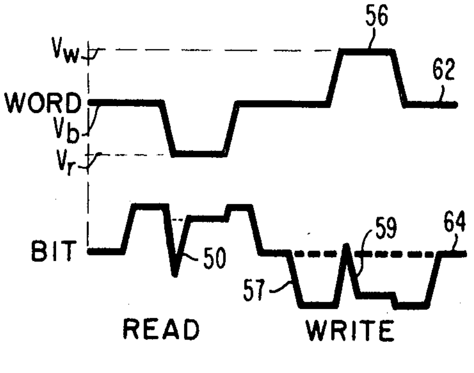
FIG. 4B shows input and output way-forms useful in explaining the operation of the unit illustrated in FIG. 1 in 2 1/2 dimension operation.

FIG. 4B depicts 2 1/2D operation of basically the same information storage unit. As indicated by input waveforms 62, interrogation of the matrix memory is accomplished by coincidental application of opposite polarity pulses to both the word and bit lines wich are capable when combined to produce a sufficiently high reverse bias threshold voltage in the device 10. As indicated in curve 64 in illustrating the sensing operation, blip 50 is detected by operational amplifier 12 whenever there is a change in the order of impedances of the heterojunctions in devcie 10. As was the case in the operation discussed in relation to FIG. 4A, the readout was destructive which necessitated restoration of the original condition of the device 10 by subsequent pulses 56 and 57 of the opposite opposing polarity.

Figure 6:
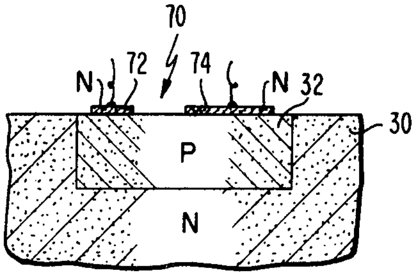
FIG. 6 is an elevational view in broken cross section of another preferred specific embodiment of a heterojunction semiconductor device which when used in an alternate embodiment of the information storage unit of the invention is capable of non-destructive read-out.
Figure 7:
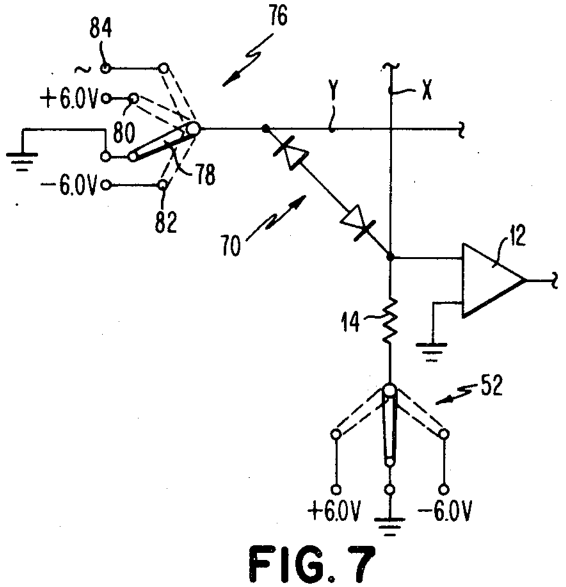
FIG. 7 is a circuit representation of another preferred embodiment of the information storage unit of the invention which is capable of non-destructive read-out.

FIGS. 6 and 7 depict another embodiment of the information storage unit of the invention which is capable of non-destructive interrogation of the matrix. Device 70, connected across X and Y lines of a matrix, is constructed such that there is a significant difference in the areas of the heterojunctions. This is illustrated in FIG. 6 which includes a semiconductor body 30 having a diffused region 32 of opposite conductivity type and two regions 72 and 74 of another type semiconductor material grown on body 30. As indicated in FIG. 6 by the relative area of the regions 72 and 74, there is a significant difference in the area of the junction between regions 32 and 72 and 32 and 74. The requirements for a high density of material imperfections discussed previously in relation to FIG. 5, also applies to the device shown in FIG. 6. Referring now to FIG. 7, there is provided a power driver circuit 76 which includes a switching means 78 capable of alternatively connecting the Y line to either a source of positive voltage 80, a source of negative voltage 82, or a source of high frequency alternating voltage 84. An operational amplifier 12 is provided to detect and amplify voltage variations across resistor 14 and switch 52. An X driver circuit 52 is also provided as in FIG. 1.

Figure 8:
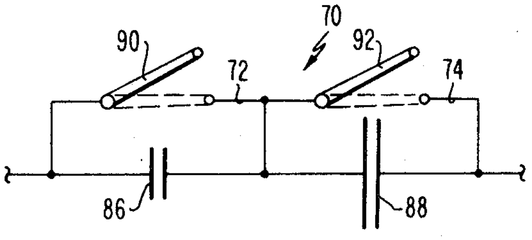
FIG. 8 is a schematic circuit representation of the heterojunction semiconductor device illustrated in FIG. 6.

FIG. 8 is a schematic representation of device 70. There is inherently a capacitance across each of the PN junctions. The smaller area junction between semiconductor region 72 and 32 is depicted by capacitor 86, smaller in magnitude than capacitor 88 corresponding to the junction between regions 74 and 32. Switches 90 and 92 depict the conditions presented by the capability of converting the junctions to either high or low impedance states. The open position of switches 90 and 92 indicates a high impedance condition whereas the dotted closed position indicates the low impedance state operation. In operation, one of switches 90 and 92 will be open and the other closed. Thus, there is presented the alternate possibilities of a small capacitor in series with a closed switch, or a large capacitor in series with a closed switch. Interrogation of device 70 connected across X and Y lines is accomplished by connecting the Y line to a source of high frequency pulse or signal 84. The strength of the signal detected by operational amplifier 12 is directly related to the relative impedance states of the heterojunctions. Obviously, high impedance states of the larger junction will produce a significatnly greater signal than a high impedance state across the smaller heterojunction. Again, the relative order of the impedance states of the device 70 can be arbitrarily chosen to indicate presence or absence of a stored data.

The significant aspect of the heterojunction devices descirbed previously made in accordance with the present invention, lies in the fact that the device advantageously employs crystalline defects or material imperfections and impurity to provide a mechanism for achieving the stable high and low impedance states described previously. A crystalline defect or material imperfection is considered in each structural aspect of a crystal or material that would not exist in a perfect material. Accordingly, crystalline defects or material imperfections include dislocations, stacking faults, and impurity atoms. Dislocations may be defined as sudden changes in the arrangement of lattice planes. While stacking faults may be defined as relatively larger changes in the arrangement of the lattice planes. Impurity atoms may be divided into and defined in terms of donor and acceptor type of impurity atoms which act to dope the material to a given conductivity type and degree and trap type impurity atoms which have energy states lying at energy levels deep in the forbidden band gap of semiconductor material. In accordance with the present invention, high density crystalline defects or material imperfections comprising dislocations, stacking faults and traps are required to achieve bistable switching and memory characteristics in heterojunction devices. It should be noted that grown heterojunction layers of the present invention may take the form of monocrystalline, polycrystalline, or amorphous materials, so long as the required density of defects or imperfections are present. The theory with respect to bistable operation and techniques for manufacturing such devices are disclosed and discussed in detail in commonly assigned Patent application serial number 49,943 (YO 9-69-085).

While the invention has been particularly shown and descirbed with reference to preferred embodiments thereof, it will be understood by those skilled in the art that the foregoing and other changes in form and details may be made therein without departing from the spirit and scope of the invention.

What is claimed is:

1. An information storage unit comprising:

a bistable semiconductor storage device having first, second and third regions of semiconductor material separated by two junctions, said first region and said third regions of a first types semiconductor material, said second region of a second type semiconductor material, terminal means on said first and third regions, said first type semiconductor material containing a high density of material imperfections, each of said junctions capable of exhibiting either a high impedance state or a low impedance state, said first region and said second region, said third region and said second region forming in series bistable switching elements in back to back relation, means to reverse the relative order of impedance states of said bistable switching elements, means to sense the relative order of the impedance states of said junctions.

2. The information storage unit of claim 1 wherein said means is to sense includes an energy source to apply electrical energy across the device terminals on said first and third regions.

3. The information storage unit of claim 2 wherein said means to sense includes means to determine whether or not a change in the order of impedance of the junctions is effected by said energy source.

4. The information storage unit of claim 3 wherein said means to sense includes a means to apply a subsequent energy pulse of opposite polarity to restore the original impedance state condition of said device after the original impedance state condition has been determined.

5. The information storage unit of claim 2 wherein said junctions of said device are of dissimilar area.

6. The information storage unit of claim 2 wherein said energy source generates a high frequency signal, and said means to sense determines the relative strength of the energy pulse conveyed through said device which is related to the relative capacitance of the junctions and the impedance states.

7. The information storage unit of claim 1 wherein said semiconductor device has two P-N heterojunctions in opposing relation.

8. An information storage unit having:

at least one memory plane including pluralities of word lines and bit lines intersecting in a matrical manner to form a plurality of cross points, a storage cell located at each of said cross points, the improvement comprising, said storage cells each comprised of a pair of bistable semiconductor heterojunctions in opposed series relation, each of said bistable heterojunctions formed by the interface between a first semiconductor material, and a second semiconductor material having a high density of imperfections which include deep energy traps existing at densities equal to or greater than the density of the doping of said second material, said junctions each capable of alternately exhibiting either a stable high impedance state or a stable low impedance state, means to reverse the relative order of impedance states of said bistable semiconductor heterojunctions, sensing means to determine the relative order of impedance in the heterojunctions of said storage cell.

9. The information storage unit of claim 8 wherein said sensing means includes energy means to selectively apply an energy pulse to said word lines of sufficient intensity to produce a change of impedances in said storage devices, and a means to detect a sharp current pulse in said bit lines indicative of a change of the order of impedances in said storage devices.

10. The information storage unit of claim 9 wherein said sensing means further includes a means to restore the impedance order by said energy means.

11. The information storage unit of claim 8 wherein said sensing means includes energy means to selectively apply coincidental pulses of differing polarity to said word lines and said bit lines to produce a change in the order of impedances in the junctions of said storage devices, and a means to detect a sharp current pulse in said bit lines indicative of a change in the order of impedances in said storage devices.

12. The information storage unit of claim 11 wherein said sensing means further includes a means to restore the impedance change produced by said energy means.

13. The information storage unit of claim 8 wherein said sensing means includes an energy means to selectively apply a high frequency signal to said word lines, said storage device having heterojunctions of differing area, a detection means responsive to a signal in said bit lines to determine the impedance state of the heterojunctions of said storage devices.

* * * * *